US011227274B2

(12) United States Patent
Arora et al.

(10) Patent No.: US 11,227,274 B2
(45) Date of Patent: Jan. 18, 2022

(54) COMPUTER SYSTEM AND COMPUTER-IMPLEMENTED METHOD FOR PROCESSING A CASHLESS PAYMENT TRANSACTION VIA A POINT-OF-SALE TERMINAL

(71) Applicant: MASTERCARD INTERNATIONAL INCORPORATED, Purchase, NY (US)

(72) Inventors: Ankur Arora, New Delhi (IN); Shreya Mittal, New Delhi (IN); Shubham Bijawat, Gurgaon (IN); Vikas Bishnoi, Jodhpur (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 52 days.

(21) Appl. No.: 16/694,439

(22) Filed: Nov. 25, 2019

(65) Prior Publication Data
US 2020/0167753 A1    May 28, 2020

(30) Foreign Application Priority Data

Nov. 27, 2018 (SG) .......................... 10201810607X

(51) Int. Cl.
*G06Q 20/20* (2012.01)
*G06Q 30/06* (2012.01)
*G06Q 20/40* (2012.01)
*G06Q 20/36* (2012.01)

(52) U.S. Cl.
CPC ......... *G06Q 20/206* (2013.01); *G06Q 20/204* (2013.01); *G06Q 20/367* (2013.01); *G06Q 20/401* (2013.01); *G06Q 30/0609* (2013.01)

(58) Field of Classification Search
None
See application file for complete search history.

(56) References Cited

U.S. PATENT DOCUMENTS

| | | | |
|---|---|---|---|
| 8,266,058 B1 * | 9/2012 | Anderson | G06Q 20/405 705/44 |
| 8,751,380 B2 * | 6/2014 | Harvey | G06Q 30/00 705/39 |
| 9,105,021 B2 * | 8/2015 | Tobin | G06Q 20/202 |

(Continued)

*Primary Examiner* — Fateh M Obaid

(57) ABSTRACT

A payment network server for processing a cashless payment transaction via a point-of-sale (POS) terminal associated with a merchant server is described. The server comprises a data storage device comprising instructions operative by a processor to: receive a tokenization request comprising payment account credentials; generate a token associated with the payment account credentials; transmit the token to the customer electronic device, where the token is transmitted to a card for processing the transaction at the POS terminal; receive a transaction request comprising the token and a payment amount; perform de-tokenization on the token to identify the payment account credentials associated with the token; transmit an authorisation request that comprises at least the payment account credentials and the payment amount to an issuer institution; receive an authorisation response comprising an indication of approval or refusal; and transmit a payment transaction response comprising approval or a refusal to the merchant.

20 Claims, 6 Drawing Sheets

(56) References Cited

U.S. PATENT DOCUMENTS

| | | | |
|---|---|---|---|
| 10,657,527 B1* | 5/2020 | Easley | G06Q 20/326 |
| 2013/0159186 A1* | 6/2013 | Brudnicki | H04W 12/068 |
| | | | 705/44 |
| 2013/0238455 A1* | 9/2013 | Laracey | G06Q 20/108 |
| | | | 705/21 |
| 2013/0246202 A1* | 9/2013 | Tobin | G06Q 20/405 |
| | | | 705/18 |
| 2015/0026058 A1* | 1/2015 | Smith | G06Q 20/32 |
| | | | 705/42 |
| 2016/0048864 A1* | 2/2016 | Beer | G06Q 30/0226 |
| | | | 705/14.27 |
| 2017/0200150 A1* | 7/2017 | Cohn | G06Q 20/38215 |
| 2018/0349889 A1* | 12/2018 | Ghosh | G06Q 20/387 |
| 2019/0050849 A1* | 2/2019 | Yoo | G06Q 20/351 |
| 2019/0392475 A1* | 12/2019 | Woodbury, Jr. | G06Q 30/0233 |

* cited by examiner

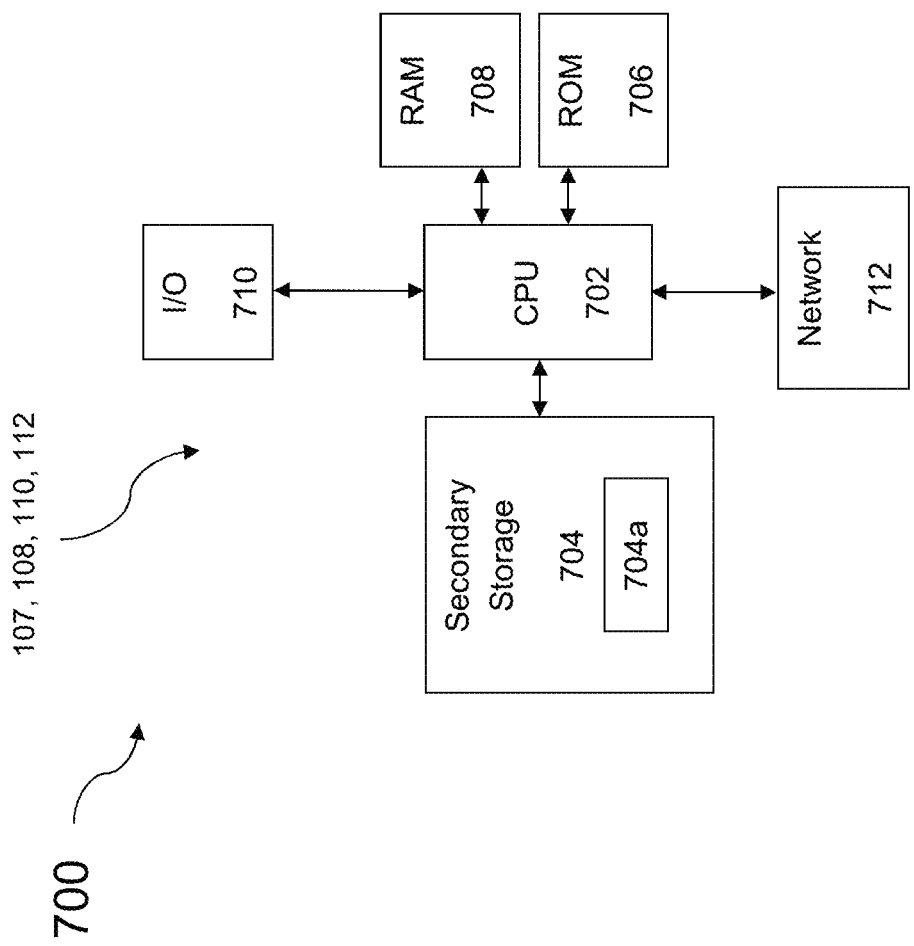

ically present at the POS terminal for processing the cashless payment transaction (e.g. it may be inconvenient for a mother of three to take care of her children and be present at the POS terminal for processing the cashless payment transaction at the same time).

COMPUTER SYSTEM AND COMPUTER-IMPLEMENTED METHOD FOR PROCESSING A CASHLESS PAYMENT TRANSACTION VIA A POINT-OF-SALE TERMINAL

CROSS-REFERENCE TO RELATED APPLICATIONS

This application claims priority to Singapore Patent Application No. 10201810607X, filed Nov. 27, 2018, entitled "Computer System and Computer-Implemented Method for Processing a Cashless Payment Transaction Via a Point-Of-Sale Terminal", the entirety of which is incorporated herein by reference.

FIELD OF THE INVENTION

The present invention relates to a computer system and computer-implemented method for processing a cashless payment transaction via a point-of-sale terminal. In particular, the invention relates to improving convenience and security for processing a cashless payment transaction via a point-of-sale terminal.

BACKGROUND OF THE INVENTION

Making payment for a purchase of goods and/or services using cashless payment means is becoming ubiquitous in recent years. Cashless payment is favoured because it reduces a need for a merchant to handle cash on a day-to-day basis since funds are wired electronically to the merchant's account for each cashless payment transaction, and it reduces a need for a customer to carry cash or change in notes and coins thereby improving convenience and security for the customer.

Nonetheless, fraud may be introduced during the course of processing a cashless payment transaction. For example, a point-of-sale (POS) terminal associated with a merchant is typically wired and fixed at a cashier associated with the merchant. In order to process a cashless payment transaction at the POS terminal, a customer is usually required to be physically present at the cashier to present his/her payment card and to provide a personal identification number (PIN). In an event that the customer is unable to be physically present at the POS terminal, the customer may choose to pass the payment card and possibly also the PIN to staff associated with the merchant to process the cashless payment transaction on his/her behalf. This leads to an opportunity for a fraudulent transaction.

It is therefore an aim of the present invention to provide a computer system and computer-implemented method for improved security for a cashless payment transaction.

SUMMARY OF THE INVENTION

In accordance with a first aspect of the present invention, there is provided a payment network server for processing a cashless payment transaction via a point-of-sale (POS) terminal associated with a merchant server. The server comprising at least a computer processor and a data storage device, the data storage device comprising instructions operative by the processor to:
receive, from a customer electronic device, a tokenization request comprising payment account credentials for use in the cashless payment transaction, the payment account credentials being associated with a customer account maintained at an issuer institution;
generate a token associated with the tokenization request, the token being associated with the payment account credentials;
transmit, to the customer electronic device, a tokenization response comprising the token, wherein the token is transmitted from the customer electronic device to a payment card for processing the cashless payment transaction at the POS terminal;
receive, from the merchant server, a payment transaction request comprising the token and a payment amount, the payment amount being a monetary amount associated with the cashless payment transaction;
perform de-tokenization on the token to identify the payment account credentials associated with the token;
transmit, to an issuer server associated with the issuer institution, a request for authorisation to proceed with the cashless payment transaction, the request for authorisation comprising at least the payment account credentials and the payment amount;
receive, from the issuer server, an authorisation response comprising an indication of whether the cashless payment transaction is approved or refused; and
transmit, to the merchant server, a payment transaction response comprising an approval or a refusal for the cashless payment transaction.

Embodiments of the invention therefore provide a payment network server that can be used for processing a cashless payment transaction via a POS terminal associated with a merchant server. In particular, the server is configured to: (i) generate a token upon request by a customer electronic device; (ii) transmit the token to the customer electronic device for use in a payment transaction request; and (iii) perform de-tokenization on the token to retrieve relevant information (e.g. payment account credentials associated with the cashless payment transaction) for processing of the cashless payment transaction. This advantageously provides a novel and secure way to process a cashless payment transaction even if the customer is physically absent from the POS terminal, by using a token in place of the customer's payment account credentials for processing the cashless payment transaction. This improves the customer experience because it minimises a need for the customer to be physi In addition, embodiments of the invention may advantageously use present infrastructures so that minimal costs will be incurred to implement the above. The primary set-up required is to store information in relation to the token generated by the payment network server. This can be easily implemented using existing memory storages, servers and/or databases.

The processor of the server may be configured to:
create a single-use identifier, the single-use identifier is associated with the payment account credentials and replaces the payment account credentials in the token;
store, using a payment network database, the single-use identifier against the payment account credentials; and
identify, using the payment network database, the payment account credentials based on the single-use identifier identified when the token is de-tokenized.

The processor of the server may be configured to:
transmit, to the customer electronic device, a request for authentication, the request for authentication being a request for the customer to approve the cashless payment transaction; and receive, from the customer electronic device, a response for authentication comprising an approval or a refusal for the cashless payment transaction to proceed.

Where the token is associated with a pre-determined time limit within which the payment transaction request is to be received, the processor may be configured to transmit, to the merchant server, a response to refuse the cashless payment transaction if the payment transaction request is received outside the pre-determined time limit.

Where the processor is configured to receive a location of the customer electronic device and where the payment transaction request comprises a location of the POS terminal, the processor of the server may be configured to:
determine if the location of the POS terminal is within a pre-determined range of the location of the customer electronic device, wherein the cashless payment transaction is refused if the location of the POS terminal is outside the pre-determined range of the location of the customer electronic device.

In accordance with a second aspect of the present invention, there is provided a computer-implemented method for processing a cashless payment transaction via a point-of-sale (POS) terminal associated with a merchant server, the method comprising:
receiving, from a customer electronic device, a tokenization request comprising payment account credentials for use in the cashless payment transaction, the payment account credentials being associated with a customer account maintained at an issuer institution;

generating a token associated with the tokenization request, the token being associated with the payment account credentials;

transmitting, to the customer electronic device, a tokenization response comprising the token, wherein the token is transmitted from a customer electronic device to a payment card for processing the cashless payment transaction at the POS terminal;

receiving, from the merchant server, a payment transaction request comprising the token and a payment amount, the payment amount being a monetary amount associated with the cashless payment transaction;
perform de-tokenization on the token to identify the payment account credentials associated with the token;

transmitting, to an issuer server associated with the issuer institution, a request for authorisation to proceed with the cashless payment transaction, the request for authorisation comprising at least the payment account credentials and the payment amount;

receiving, from the issuer server, an authorisation response comprising an indication of whether the cashless payment transaction is approved or refused; and transmitting, to the merchant server, a payment transaction response comprising an approval or a refusal for the cashless payment transaction.

The method may comprise:
creating a single-use identifier, the single-use identifier is associated with the payment account credentials and replaces the payment account credentials in the token;
storing, using a payment network database, the single-use identifier against the payment account credentials; and
identifying, using the payment network database, the payment account credentials based on the single-use identifier identified when the token is de-tokenized.

The method may comprise:
transmitting, to the customer electronic device, a request for authentication, the request for authentication being a request for the customer to approve the cashless payment transaction; and receiving, from the customer electronic device, a response for authentication comprising an approval or a refusal for the cashless payment transaction to proceed.

Where the token is associated with a pre-determined time limit within which the payment transaction request is to be received, the method may comprise, if the payment transaction request is received outside the pre-determined time limit, transmitting, to the merchant server, a response to refuse the cashless payment transaction.

Where the method comprises receiving, from the customer electronic device, a location of the customer electronic device and where the payment transaction request comprises a location of the POS terminal, the method may comprise:
determining if the location of the POS terminal is within a pre-determined range of the location of the customer electronic device, wherein the cashless payment transaction is refused if the location of the POS terminal is outside the pre-determined range of the location of the customer electronic device.

The payment card may be associated with the customer.
The payment card may be associated with the merchant.
The token may be transmitted to the payment card via near-field communication (NFC).

In accordance with a third aspect of the present invention, a non-transitory computer-readable medium having stored thereon program instructions for causing at least one processor to perform the preceding method.

Embodiments of the present invention aim to provide a new and useful computer system and computer-implemented method for processing a cashless payment transaction via a point-of-sale (POS) terminal associated with a merchant for improving security and enhancing customer experience of the cashless payment transaction.

BRIEF DESCRIPTION OF THE DRAWINGS

Non-limiting embodiments of the invention will now be described for the sake of example only, with reference to the following drawings in which:

FIG. 7 shows schematically a hardware structure of a server which may be used in the computer system of FIG. 1 to implement a method in accordance with an embodiment of the invention.

DETAILED DESCRIPTION OF THE EMBODIMENT

Figure 1:
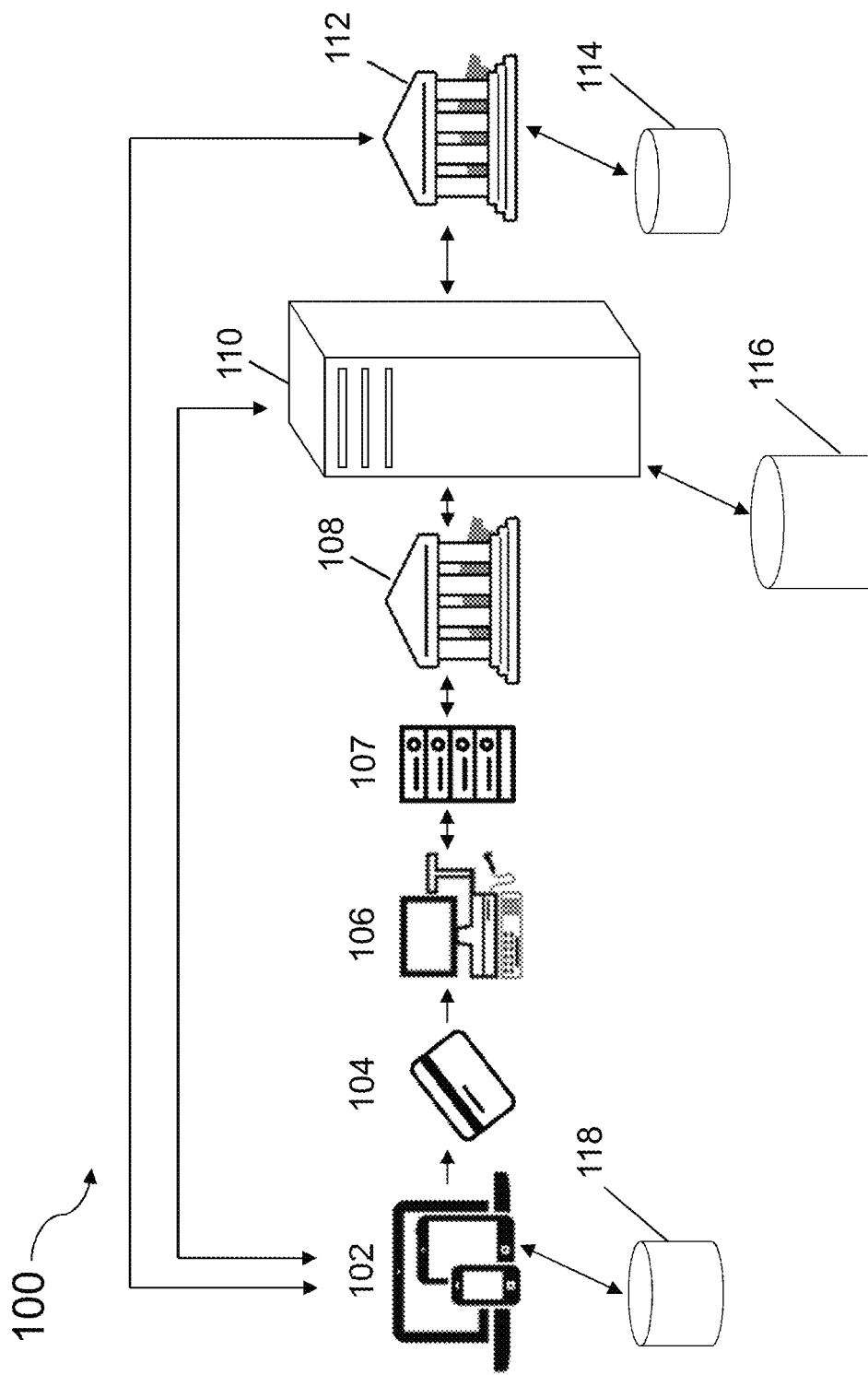
FIG. 1 shows a computer system for processing a cashless payment transaction via a point-of-sale (POS) terminal associated with a merchant server in accordance with an embodiment of the invention.

As used in this document, the term "account" refers to any payment account maintained by a financial institution, the account may be associated with a payment vehicle such as a credit card, a debit card, a prepaid card, a charge card, a membership card, a promotional card, a frequent flyer card, an identification card, a prepaid card, a gift card, and/or any other payment device that may hold payment account information, such as mobile phones, Smartphones, personal digital assistants (PDAs), key fobs, transponder devices, NFC-enabled devices, and/or computers.

The term "payment account credentials" refers to any qualification associated with a payment account, for example, a debit, pre-paid or other non-credit card number, PAN, expiry date, card verification value and the like.

As used in this document, the term "payment card" refers to any electronic cashless payment vehicle. A payment card may be associated with an account (e.g. a customer account). In some embodiments, a payment card is associated with a merchant (e.g. a dummy electronic card specifically designed to receive and transmit a token used in a cashless payment transaction).

The term "POS terminal" refers to any apparatus associated with a merchant which can be used for processing a cashless payment transaction.

Note that the term "institution" is used here in a sense which is not necessarily limited to organizations which are legally constituted as banks, since in some jurisdictions other organizations may be permitted to maintain financial accounts such as a payment card account. An institution may be one of the following: a bank, a financial technology company, a telecommunication company or a financial institution.

As used in this application, the terms "component," "module," "system," "apparatus," "interface," or the like are generally intended to refer to a computer-related entity, either hardware, a combination of hardware and software, software, or software in execution. For example, a component or a module may be, but is not limited to being, a process running on a processor, a processor, an object, an executable, a thread of execution, a program, and/or a computer. By way of illustration, both an application running on a controller and the controller can be a component or a module. One or more components/modules may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. For instance, the claimed subject matter may be implemented as a computer-readable medium embedded with a computer executable program, which encompasses a computer program accessible from any computer-readable storage device or storage media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

FIG. 1 shows a computer system 100 for processing a cashless payment transaction via a point-of-sale (POS) terminal associated with a merchant server in accordance with an embodiment of the invention. The computer system 100 comprises a payment network server 110 which facilitates a payment transaction between a customer and a merchant. The payment network server 110 is associated with a payment network such as the Banknet payment network operated by MasterCard®. As shown in FIG. 1, the payment network server 110 is in communication with an acquirer server 108 and an issuer server 112. The acquirer server 108 is operated by an acquirer institution at which the merchant maintains a merchant account to receive funds. The issuer server 112 is associated with an issuer institution which maintains at least a customer account which can be used for payment in payment transactions (e.g. cashless payment transactions at a point-of-sale (POS) terminal). The computer system 100 further comprises a customer electronic device 102, a physical payment card 104, a POS terminal 106 and a merchant server 107. The customer electronic device 102 is any electronic device which enables the customer to process the cashless payment transaction (e.g. via an application stored on the customer electronic device 102). The customer electronic device 102 may be a mobile phone, a laptop/notebook, a desktop, a tablet, a personal digital assistant (PDA), a key fob, a transponder device, a NFC-enabled device, and/or a computer. The payment card 104 may be any electronic card capable of receiving and transmitting payment details for processing the cashless payment transaction. In some embodiments, the payment card 104 is associated with the customer. In some embodiments, the payment card 104 is associated with the merchant (e.g. the merchant may provide an electronic card for the purpose of receiving and transmitting payment details). The POS terminal 106 may be located in a specific location (e.g., a cashier) in a merchant's shop and will be associated with the merchant server 107 for processing the cashless payment transaction.

Moreover, an issuer database 114 is operationally connected to the issuer server 112. The issuer database 114 serves at least to store data related to a customer account associated with the customer which can be used in processing a cashless payment transaction. The data associated with the customer account may comprise a customer account number, details associated with the customer (a customer name, a customer's date of birth etc.) and details associated with a status of the customer account (e.g. an available balance, transaction history etc.). In some embodiments, a payment network database 116 may be operationally connected to the payment network server 110. The payment network database 116 may store data related to at least a cashless payment transaction associated with the customer (e.g. a cashless payment transaction number, a transaction date, a payment amount etc.). The payment network database 116 may store information associated with a token (e.g. data associated with a token, a tokenization request date etc.) generated for use in processing the cashless payment transaction. In some embodiments, the payment network database 116 stores a single-use identifier against payment account credentials associated with a customer account (e.g. a customer account number) for processing the cashless payment transaction. A customer database 118 may also be part of the computer system 100. The customer database 118 may store at least an application (e.g. a mobile App) which can be used to request a token for processing the cashless payment transaction. The customer database 118 may store a token received from the payment network server 110 for use in processing the cashless payment transaction. Although the issuer database 114, the payment network database 116 and the customer database 118 are shown as external databases in FIG. 1, these databases 114, 116, 118 may also form part of the issuer server 112, the payment network server 110 and the customer electronic device 102 respectively.

The present invention aims to build upon present infrastructures for processing a cashless payment transaction via a POS terminal 106 associated with a merchant server 107. In particular, the present invention involves using a token for initialising a cashless payment transaction request. This advantageously provides a novel and secure way to process a cashless payment transaction even if the customer is physically absent from the POS terminal 106, by using the token in place of the customer's payment account credentials for the cashless payment transaction.

In order to achieve the above, the payment network server 110 is configured to: (i) receive a tokenization request comprising payment account credentials for use in the cashless payment transaction, the payment account credentials being associated with a customer account maintained at an issuer institution; (ii) generate a token associated with the tokenization request where the token is associated with the payment account credentials; (iii) transmit a tokenization response comprising the token to the customer electronic device 102, where the token is transmitted from the customer electronic device 102 to a payment card 104 for processing the cashless payment transaction at the POS terminal 106; (iv) receive a payment transaction request comprising the token and a payment amount from the merchant server 107 where the payment amount is a monetary associated with the cashless payment transaction; (v) perform de-tokenization on the token to identify the payment account credentials associated with the token; (vi) transmit a request for authorisation to proceed with the cashless payment transaction to an issuer server 112 associated with the issuer institution, the request for authorisation comprising at least the payment account credentials and the payment amount; (vii) receive an authorisation response comprising an indication of whether the cashless payment transaction is approved or refused from the issuer server 112; and (viii) transmit a payment transaction response comprising an approval or a refusal for the cashless payment transaction to the merchant server 107.

Typically, in order to process a cashless payment transaction at a POS terminal 106 associated with a merchant server 107, a customer presents his/her payment card 104 at the POS terminal 106 (e.g. at a cashier) where the customer may either be asked to enter a PIN or to provide a signature (or biometric) to authenticate the cashless payment transaction. There are times, however, that the customer may find it inconvenient to be physically present at the POS terminal 106 for processing the cashless payment transaction.

In embodiments of the present invention, instead of providing the PIN or the signature for authenticating the cashless payment transaction, the customer transmits a tokenization request, via a suitable application on the customer electronic device 102, to the payment network server 110. The tokenization request comprises at least payment account credentials for use in the cashless payment transaction, the payment account credentials being associated with a customer account maintained at the issuer institution associated with the issuer server 112. The tokenization request may be initiated by the customer at the time of payment for the cashless payment transaction. In some embodiments, the payment account credentials comprise a payment card number associated with a customer payment card for use in the cashless payment transaction. In these cases, the payment account credentials may also comprise other information such as a card verification coded (CVC), a name of the cardholder, an expiry date of the payment card etc. which may also be included in the tokenization request. In some embodiments, the customer is required to log into the application using his/her customer details which are registered with the issuer institution. In these cases, the payment account credentials may be automatically included in the tokenization request so that no manual input of the payment account credentials is required for providing the payment account credentials in the tokenization request. In some embodiments, more than one customer accounts are associated with the application on the customer electronic device 102. In these cases, it may be necessary for the customer to choose which of the more than one customer accounts he/she wishes to use for payment of the cashless payment transaction. In any of these cases, the payment network server 110 is configured to receive the tokenization request from the customer electronic device 102, and to generate a token associated with the tokenization request.

The token may be any string of numbers, alphabets or alphanumeric associated with the payment account credentials and which replaces the payment account credentials for use at the POS terminal 106. Once the token has been generated, the payment network server 110 is configured to transmit a tokenization response comprising the token to the customer electronic device 102. The tokenization response may be received by the customer via the application on the customer electronic device 102. The customer may be presented with an option to transmit the token to the payment card 104 for processing the cashless payment transaction. In some embodiments, the customer specifies the payment amount for use with the token and the specified payment amount is transmitted to the payment card 104 along with the token. The specified payment amount may be of a value equal to or higher than a billed amount for the cashless payment transaction, the billed amount being a monetary amount due to the merchant in relation to the cashless payment transaction. The token may be transmitted to the payment card 104 via near-field communication (NFC). If a specified payment amount is to be transmitted to the payment card 104, the specified amount may also be transmitted using NFC via the application on the customer electronic device 102. The token may be associated with a pre-determined time limit within which the token is to be utilised in the form of a payment transaction request transmitted by the merchant to the payment network server 110. The payment network server 110 may be configured to transmit, to the merchant server 107, a response to refuse the cashless payment transaction if the payment transaction request is received outside the pre-determined time limit. The pre-determined time limit may be set by the customer or the payment network server 110. The pre-determined time limit may be a time period of 30 seconds, 1 minute, 2 minutes, 3 minutes, 5 minutes, 10 minutes etc., or any period of time which is considered suitable. The payment card 104 may be associated with the merchant or the customer. In some embodiments, the payment card 104 is the customer payment card associated with the customer account used for payment of the cashless payment transaction. In some embodiments, the payment card 104 is any electronic card associated with the merchant which can be used to receive and transmit the token. Once the token has been stored in the payment card 104, staff associated with the merchant may transfer the payment card 104 physically to the POS terminal 106 (which may be located at a distance from the customer) for use in processing of the cashless payment transaction.

The POS terminal 106 may comprise a suitable input/output device for reading the token from the payment card 104. Upon retrieving the token from the payment card 104, the staff may initiate a payment transaction request for the cashless payment transaction via the POS terminal 106. The payment transaction request comprises at least the token and a payment amount, the payment amount being a monetary amount associated with the cashless payment transaction. In embodiments where a specified payment amount is also transmitted to the payment card 104, the payment amount included in the payment transaction request is the specified payment amount. The payment transaction request may comprise transaction details such as a merchant's name for identifying the merchant, the time and date of the cashless payment transaction etc. The payment transaction request may be forwarded by the acquirer server 108 and received by the payment network server 110. The payment network server 110 is configured to perform de-tokenization on the token comprised in the payment transaction request to identify the payment account credentials associated with the token.

After the token has been de-tokenized and the necessary information identified in association with the token, the payment network server 110 is configured to transmit a request for authorisation to proceed with the cashless payment transaction to the issuer server 112. The request for authorisation comprises at least the payment account credentials identified using the token and the payment amount. In this case, the issuer server 112 may be configured to check an available balance of the customer account associated with the customer account number to determine if the available balance is more than the payment amount (or conversely, if the available balance is less than the payment amount). The available balance may comprise any overdraft balance available to the customer account. In some embodiments where the CVC and/or the expiry date are included in the token, the request for authorisation may comprise the CVC and/or the expiry date of the payment card. In these cases, in order to authorise the payment transaction, the issuer server 110 may be configured to (i) verify the CVC code and/or (ii) the expiry date of the payment card. The issuer server 112 then authorises the payment transaction if the available balance is equal to or more than the payment amount and/or the relevant details are verified.

The issuer server 112 is configured to transmit an authorisation response to the payment network server 110 after authorisation of the cashless payment transaction has been processed. The authorisation response comprises an indication of whether the cashless payment transaction is approved or refused. Upon receiving the authorisation response from the issuer server 112, the payment network server 110 is configured to transmit a payment transaction response comprising an approval or a refusal for the cashless payment transaction to the customer electronic device 102.

Although only one customer electronic device 102, one payment card 104 and only one POS terminal 106 is shown in FIG. 1, a plurality of customer electronic devices 102, a plurality of payment cards 104 and a plurality of POS terminals 106 associated with respective merchant servers 107 may also form part of the computer system 100. Similarly, a plurality of acquirer servers 108 and a plurality of issuer servers 112 may also be in communication with the payment network server 110 and form part of the computer system 100. A plurality of issuer databases 114 and/or customer databases 118 associated with respective issuer servers 112 and customer electronic devices 102 respectively may also form part of the computer system 100. A plurality of payment network databases 116 may also be associated with the payment network server 110 and form part of the computer system 100.

Communication between the customer electronic device 102, servers 108, 110, 112 and databases 114, 116, 118 may take place via any type of system, for example, a virtual private system (VPN), the Internet, a local area and/or wide area system (LAN and/or WAN), and so on.

Figure 2:
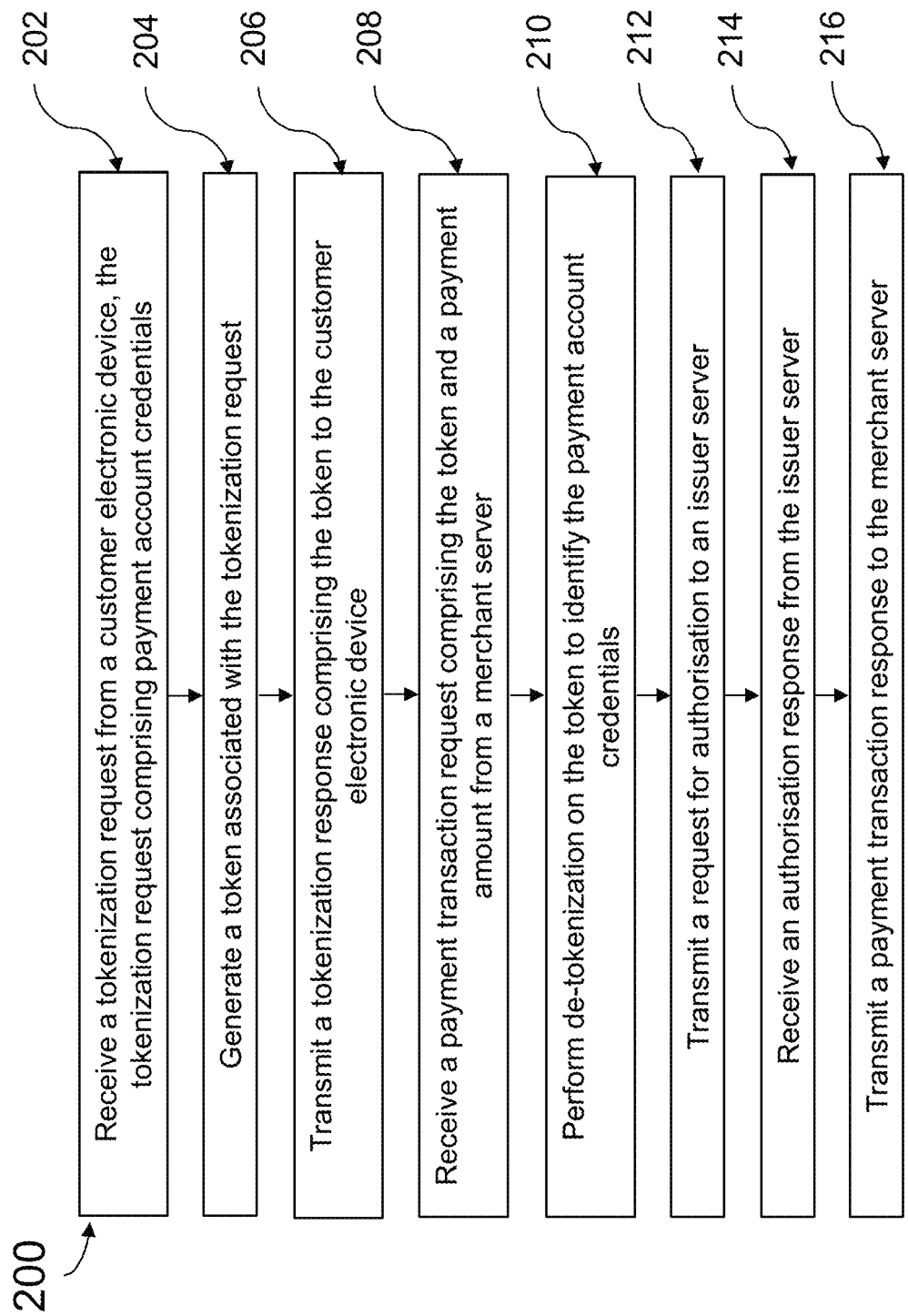
FIG. 2 shows steps of a method for processing a cashless payment transaction via a POS terminal associated with a merchant server in accordance with an embodiment of the invention.

FIG. 2 shows steps of a method 200 for processing a cashless payment transaction via the point-of-sale (POS) terminal 106 associated with the merchant server 107 in accordance with an embodiment of the invention. The method 200 may be carried out using the payment network server 110 as shown in FIG. 1.

In a step 202, the payment network server 110 is configured to receive a tokenization request comprising payment account credentials for use in the cashless payment transaction from the customer electronic device 102. In some embodiments where a customer payment card is used for processing the cashless payment transaction, the payment account credentials comprises a CVC, a name of a cardholder associated with the customer payment card and/or an expiry date of the customer payment card.

In a step 204, the payment network server 110 is configured to generate a token associated with the tokenization request where the token is associated with the payment account credentials.

In a step 206, the payment network server 110 is configured to transmit a tokenization response comprising the token to the customer electronic device 102. The token is subsequently transmitted from the customer electronic device 102 to the payment card 104 for processing the cashless payment transaction.

In a step 208, the payment network server 110 is configured to receive, a payment transaction request from the POS terminal 106 via the merchant server 107. The payment transaction request comprises at least the token and a payment amount associated with the cashless payment transaction.

In a step 210, the payment network server 110 is configured to perform de-tokenization on the token to identify the payment account credentials.

Once the necessary information (i.e. the payment account credentials) have been identified in the step 210, the payment network server 108 is configured to transmit a request for authorisation to proceed with the cashless payment transaction to the issuer server 112 in a step 212. The request for authorisation comprises at least the payment account credentials and the payment amount. In embodiments where the payment account credentials comprise the CVC, the name of the cardholder and/or the expiry date associated with the customer payment card the issuer server 112 may perform the necessary verification as discussed previously in relation to FIG. 1 before authorising the payment transaction.

In a step 214, the payment network server 110 is configured to receive an authorisation response from the issuer server 112. The authorisation response comprises an indication of whether the cashless payment transaction is approved or refused.

In a step 216, the payment network server 110 is configured to transmit a payment transaction response comprising an approval or a refusal for the cashless payment transaction to the POS terminal 106 via the merchant server 107. If the payment transaction is not authorised, the payment network server 110 may inform the customer (e.g. via the POS terminal 106 and the merchant server 107) of a failure to authorise the cashless payment transaction and may request another form of payment if the customer wishes to continue processing the cashless payment transaction.

Figure 3:
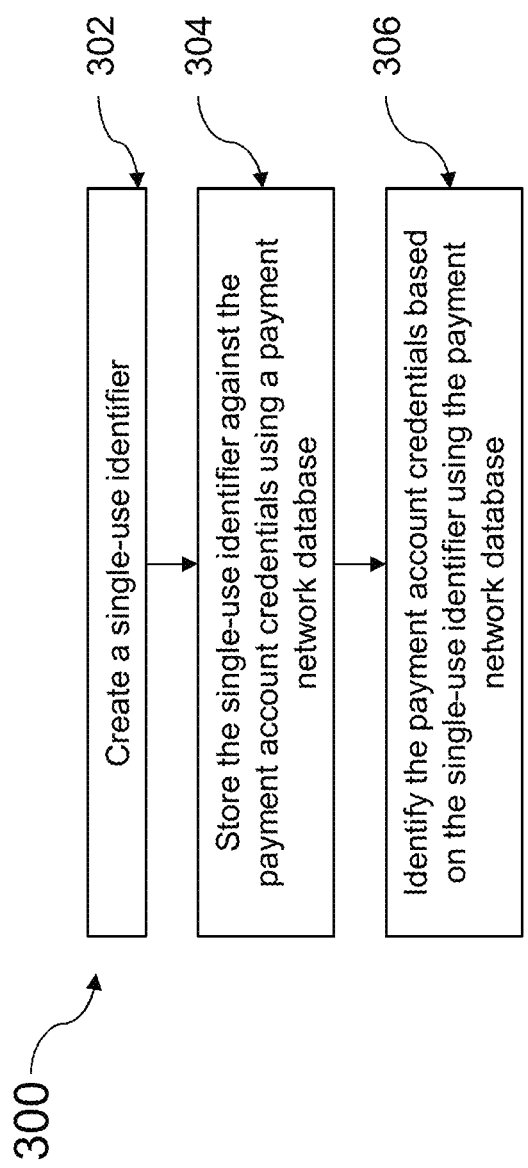
FIG. 3 shows steps of a method for processing a cashless payment transaction via a POS terminal associated with a merchant server in accordance with an embodiment of the invention.

FIG. 3 shows steps of a method 300 for processing a cashless payment transaction via the point-of-sale (POS) terminal 106 associated with the merchant server 107 in accordance with an embodiment of the invention. The method 300 provides an embodiment where a single-use identifier is used for processing the cashless payment transaction in place of the payment account credentials. This advantageously improves security for processing the cashless payment transaction since transmission of sensitive details (e.g. the payment account credentials) are minimised in this case.

In a step 302, the payment network server 110 is configured to create a single-use identifier. The single-use identifier is associated with the payment account credentials and is used to replace the payment account credentials in the token. In this embodiment, the token comprised in the tokenization response transmitted to the customer electronic device 102 in the step 206 is a tokenized version of the single-use identifier. The single-use identifier may be a random string of numbers or symbols or alphanumeric characters generated by the payment network server 110.

In a step 304, the payment network server 108 is configured to store the single-use identifier against the payment account credentials using the payment network database 116. The step 304 may be performed prior to or after the token is transmitted to the customer electronic device 102 in the step 206 in this embodiment.

Once the single-use identifier is stored against the payment account credentials in the step 304, the single-use identifier is ready for use in processing the cashless payment transaction in place of the payment account credentials. In embodiments where the single-use identifier is used, the payment network server 110 is configured to receive the tokenized version of the single-use identifier comprised in the payment transaction request from the POS terminal 106 via the merchant server 107 in the step 208. The payment network server 110 is then configured to identify the payment account credentials associated with the single-use identifier in a step 306, once the single-use identifier is identified using the payment network database 116 when the token is de-tokenized in the step 210. The identified payment account credentials can then be used in the steps 212 to 216 for subsequent processing of the cashless payment transaction.

Figure 4:
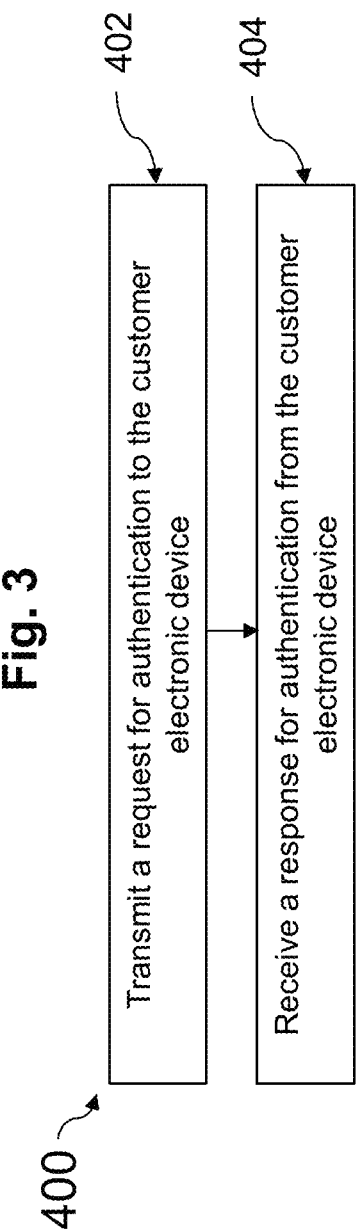
FIG. 4 shows steps of a method for authenticating a cashless payment transaction in accordance with an embodiment of the invention.

FIG. 4 shows steps of a method 400 for authenticating a cashless payment transaction in accordance with an embodiment of the invention. This is an optional authentication process for the cashless payment transaction, which may be carried out by either the payment network server 110 or the issuer server 112.

In a step 402, the payment network server 110 or the issuer server 112 is configured to transmit a request for authentication to the customer electronic device 102. The request for authentication is a request for the customer to approve the cashless payment transaction, and comprises at least the payment amount for the cashless payment transaction. The request of authentication may comprise a name of the merchant and/or a time at which the payment transaction request for the cashless payment transaction is transmitted.

In a step 404, the payment network server 110 or the issuer server 112 is configured to receive a response for authentication from the customer electronic device 102. The response for authentication comprises an approval or a refusal for the cashless payment transaction to proceed. In some embodiments, the approval or refusal for the cashless payment transaction may be transmitted via the application in the customer electronic device 102. The approval or refusal may be executed by pressing a button on the customer electronic device 102 or it may involve a further authentication of the customer comprising verification of the customer's biometric data (e.g. a fingerprint) on the customer electronic device 102 or a one-time-password (OTP) transmitted to the customer electronic device 102 by the payment network server 110 or the issuer server 112.

In some embodiments, a location of the customer electronic device 102 is compared with a location of the POS terminal 106 as a measure for detecting fraudulent transaction. In addition to the tokenization request transmitted to the payment network server 110 from the customer electronic device 102 in the step 202, the customer electronic device 102 may transmit a location of the customer electronic device 102 to the payment network server 108. In these cases, the payment transaction request received at the payment network server 110 from the POS terminal 106 in the step 208 may comprise a location of the POS terminal 106, in addition to the token and the payment amount. The location of the customer electronic device 102 and/or the POS terminal 106 may be determined using a global positioning system (GPS) or the like. The payment network server 110 may be configured to determine if the location of the POS terminal 106 is within a pre-determined range of the location of the customer electronic device 102. The pre-determined range may be defined by the customer or the payment network server 110. The pre-determined range of distance may be 5 metres, 10 metres, 20 metres, 30 metres, 50 metres, 100 metres, 200 metres, or any other distance deemed suitable. The cashless payment transaction is refused if the location of the POS terminal 106 is outside the pre-determined range of the location of the customer electronic device 102.

Figure 5:
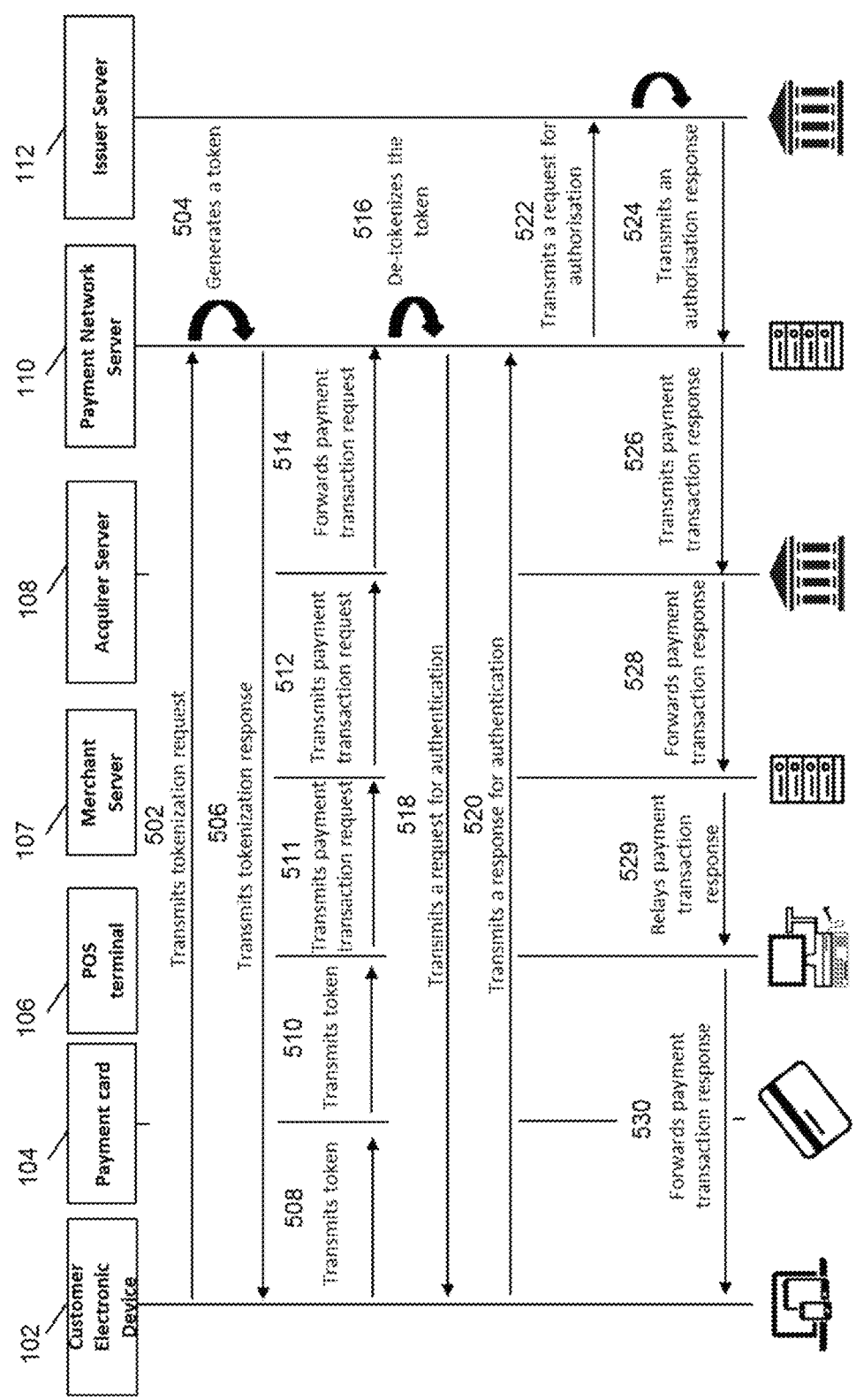
FIG. 5 shows steps of a method for processing a cashless payment transaction via a POS terminal associated with a merchant server in accordance with an embodiment of the invention.

FIG. 5 illustrates an exemplary embodiment for processing a cashless payment transaction via a point-of-sale (POS) terminal associated with a merchant.

In embodiments of the present invention, prior to the merchant server 107 transmitting a payment transaction request to the payment network server 110 to process the cashless payment transaction, the customer initiates a tokenization request with the payment network server 110 using the customer electronic device 102. In a step 502, the customer transmits a tokenization request, via a suitable application in the customer electronic device 102, to the payment network server 110. The tokenization request may be transmitted at the time of payment of the cashless payment transaction. In other words, the tokenization request is initiated by the customer for use in payment for the cashless payment transaction. The tokenization request comprises at least payment account credentials for use in the cashless payment transaction, the payment account credentials being associated with a customer account maintained at an issuer institution. In some embodiments, the payment account credentials comprise a payment card number associated with a customer payment card for use in the cashless payment transaction. In these cases, other information, for example a card verification coded (CVC), a name of the cardholder, an expiry date of the payment card etc., may also be included in the tokenization request. In some embodiments, the customer is required to log into the application using his customer details which are registered with the issuer institution. In these cases, the payment account credentials may be automatically included in the tokenization request so that no manual input of the customer account number is required. In some embodiments, more than one customer accounts are associated with the application on the customer electronic device 102. In these cases, it is necessary for the customer to choose which of the more than one customer accounts he/she wishes to use for payment of the cashless payment transaction. In any of these cases, the payment network server 110 is configured to receive the tokenization request from the customer electronic device 102. In some embodiments, the payment network server 110 is configured to receive a location of the customer electronic device 102.

Upon receiving the tokenization request from the customer electronic device 102 in the step 502, the payment network server 110 is configured to generate a token associated with the tokenization request in a step 504. The token is associated with the payment account credentials for use in the cashless payment transaction, and it replaces the payment account credentials in subsequent steps for processing the cashless payment transaction so as to improve a security for the cashless payment transaction. In some embodiments, the payment network server 110 is configured to receive information in regards to a location of the customer electronic device 102.

Once the token has been generated in the step 504, the payment network server 110 is configured to transmit a tokenization response comprising the token to the customer electronic device 102 in a step 506. The tokenization response may be received by the customer via the application in the customer electronic device 102. The customer may be presented with an option to transmit the token to the payment card 104 for processing the cashless payment transaction. In a step 508, the token is transmitted from the customer electronic device 102 to the payment card 104. The token may be transmitted to the payment card 104 via near-field communication (NFC). In some embodiments where the location of the customer electronic device 102 has not been received at the payment network server 110 from the customer electronic device 102, information in regards to the location of the customer electronic device 102 can be transmitted directly to the payment card 104 at this point, together with the token. The token may be associated with a pre-determined time limit within which the token is to be utilised in the form of a payment transaction request transmitted by the merchant server 107 to the payment network server 110. The payment network server 110 may be configured to transmit, to the merchant server 107, a response to refuse the cashless payment transaction if the payment transaction request is received outside the pre-determined time limit. The pre-determined time limit may be set by the customer or the payment network server 110. The pre-determined time limit may be a time period of 30 seconds, 1 minute, 2 minutes, 3 minutes, 5 minutes, 10 minutes etc., or any period of time which is considered suitable. Once the token has been stored at the payment card 104, staff associated with the merchant may transfer the payment card 104 physically to the POS terminal 106 for use in processing of the cashless payment transaction.

In a step 510, the token is transmitted from the payment card 104 to the POS terminal 106. In some embodiments, information in regards to the location of the customer electronic device 102 is transmitted from the payment card 104 to the POS terminal 106. Upon receiving the token and/or the location of the customer electronic device 102 from the payment card 104, the staff may initiate a payment transaction request for the cashless payment transaction using the POS terminal 106. The payment transaction request is transmitted or relayed to the merchant server 107 in a step 511. The payment transaction request comprises at least the token and the payment amount associated with the cashless payment transaction. The payment transaction request may comprise transaction details such as a merchant's name for identifying the merchant, the time and date of the cashless payment transaction etc. The payment transaction request may comprise information in regards to a location of the POS terminal associated with the merchant. In some embodiments, where information in regards to a location of the customer electronic device 102 has not been previously received by the payment network server 110, the payment transaction request includes the location of the customer electronic device 102 as received from the payment card 104.

The payment transaction request is transmitted from the merchant server 107 to the acquirer server 108 in a step 512, which is in turn forwarded by the acquirer server 108 to the payment network server 110 in a step 514. The payment network server 110 is configured to perform de-tokenization on the token comprised in the payment transaction request to identify the payment account credentials in a step 516. In embodiments where the payment account credentials comprise the CVC, the name of the cardholder and/or the expiry date of the customer payment card, the CVC, the name of the cardholder and/or the expiry date of the customer payment card are identified when the token is de-tokenized.

In some embodiments where the payment network server 110 is configured to request authentication from the customer to proceed with the cashless payment transaction, the payment network server 110 is configured to transmit a request for authentication to the customer electronic device 102 in a step 518. The request for authentication is a request for the customer to approve the cashless payment transaction, and may comprise at least the payment amount for the cashless payment transaction.

In a step 520, the payment network server 110 is configured to receive a response for authentication from the customer electronic device 102. The response for authentication comprises an approval or a refusal for the cashless payment transaction to proceed. In some embodiments, the approval or refusal for the cashless payment transaction may be transmitted via the application in the customer electronic device 102. The approval or refusal may be executed by simply pressing a button on the customer electronic device 102 or it may involve a further authentication of the customer comprising verification of the customer's biometric data (e.g. a fingerprint) on the customer electronic device 102 or a one-time-password (OTP) transmitted to the customer electronic device 102 by the payment network server 110.

In some embodiments (not shown in FIG. 5) where information in regards to the location of the customer electronic device 102 and information in regards to the location of the POS terminal 106 is received at the payment network server 110, the payment network server 110 is configured to determine if the location of the POS terminal 106 is within a pre-determined range of the location of the customer electronic device 102. The cashless payment transaction is refused if the location of the POS terminal 106 is outside the pre-determined range of the location of the customer electronic device 102.

Regardless of whether authentication of the customer and/or authentication via geo-locations of the customer electronic device 102 and the POS terminal 106 are carried out by the payment network server 110 (e.g. by the steps 518 and 520 as discussed above), the payment network server 110 is configured to transmit a request for authorisation to proceed with the cashless payment transaction to the issuer server 112 in a step 522. The request for authorisation comprises at least the payment account credentials identified from the token and the payment amount. In this case, the issuer server 112 may be configured to check an available balance of the customer account associated with the customer account number to determine if the available balance is more than the payment amount (or conversely, if the available balance is less than the payment amount). The available balance may comprise any overdraft balance available to the customer account. In some embodiments where the CVC and/or the expiry date are included in the token, the request for authorisation may comprise the CVC and/or the expiry date of the payment card. In these cases, in order to authorise the payment transaction, the issuer server 110 may be configured to (i) verify the CVC code and/or (ii) the expiry date of the payment card. In some embodiments, authentication of the customer (similar to that described in the steps 518 and 520) may be carried out by the issuer server 112 at this stage. The issuer server 112 then authorises the payment transaction if the necessary verifications as described above are satisfied.

The issuer server 112 is configured to transmit an authorisation response to the payment network server 110 after authorisation of the cashless payment transaction has been processed in a step 524. The authorisation response comprises an indication of whether the cashless payment transaction is approved or refused. Upon receiving the authorisation response from the issuer server 112 in the step 524, the payment network server 110 is configured to transmit a payment transaction response comprising an approval or a refusal for the cashless payment transaction to the customer electronic device 102. As shown in FIG. 5, the payment transaction response may be transmitted from the payment network server 110 to the acquirer server 108 in a step 526, where the payment transaction response is forwarded by the acquirer server 108 to merchant sever in a step 528. The payment transaction response is in turn relayed to the POS terminal 106 in a step 529. The payment transaction response may then be presented to the customer either physically or via the customer electronic device 102 by the POS terminal 106 in a step 530.

Figure 6:
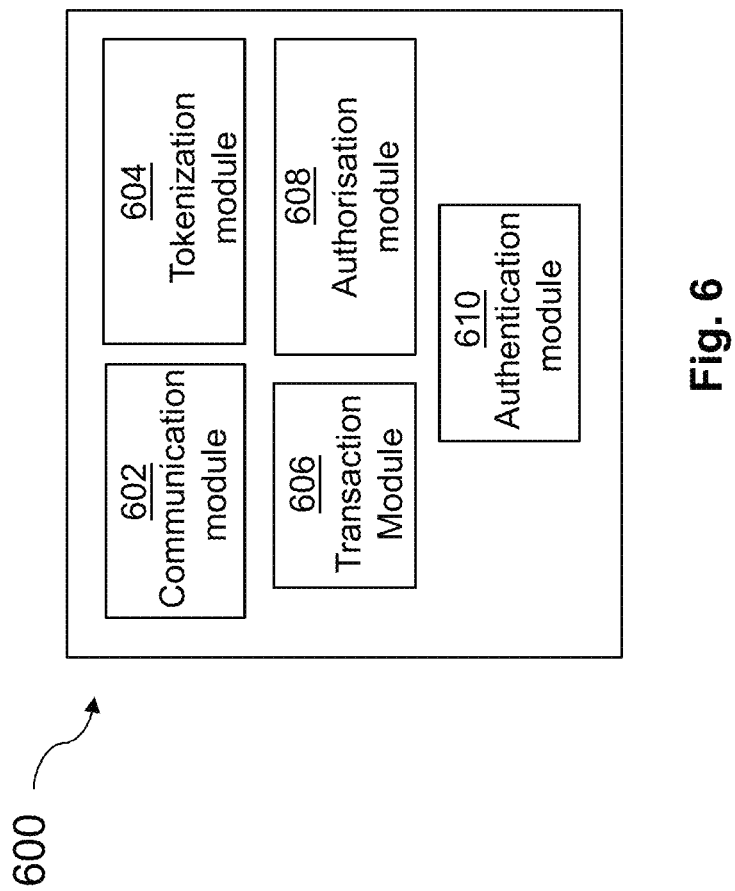
FIG. 6 shows schematically a functional structure of a payment network server which may be used in the computer system shown in FIG. 1 to implement a method in accordance with an embodiment of the invention.

FIG. 6 shows schematically a structure 600 of the payment network server 110 in accordance with embodiments of the invention. The structure 600 of the payment network server 110 comprises a communication module 602, a tokenization module 604, a transaction module 606, an authorisation module 608, and an authentication module 610.

The communication module 602 is configured to enable the payment network server 110 to communicate with at least the acquirer server 108 and the issuer server 112 as provided in the computer system 100. The communication module 602 may be configured to enable the payment network server 110 to communicate with the customer electronic device 102. The communication module 602 may be configured to enable the payment network server 110 to communicate with the payment network database 116. The communication module 602 is configured to work in tandem with other modules of the payment network server 110 as discussed in more detail below.

The tokenization module 604 is configured to work with the communication module 602 to receive a tokenization request comprising payment account credentials from the customer electronic device 102. The payment account credentials are associated with a customer account maintained at an issuer institution. In some embodiments, where the payment account credentials comprise a payment card number associated with a customer payment card for use in the cashless payment transaction, other information such as a card verification coded (CVC), a name of the cardholder, an expiry date of the payment card etc., are included in the tokenization request (i.e. the payment account credentials comprised in the tokenization request may comprise this other information). The tokenization module 604 is configured to generate a token associated with the tokenization request where the token is associated with the payment account credentials, the token being a tokenized form of the payment account credentials. Once the token has been generated, the tokenization module 604 is configured to transmit a tokenization response comprising the token to the customer electronic device 102. The token is transmitted subsequently from the customer electronic device 102 to the payment card 104 for processing the cashless payment transaction. The token may be transmitted from the customer electronic device 102 to the payment card 104 via near-field communication (NFC). Upon receiving a payment transaction request from the merchant server 107 via the communication module 602, the tokenization module 604 is configured to perform de-tokenization on the token to identify the payment account credentials. In some embodiments, the tokenization module 604 is configured to create a single-use identifier, where the single-use identifier is associated with the payment account credentials and replaces the payment account credentials in the token. The single-use identifier may be any string or form of numbers, alphanumeric characters or symbols. The tokenization module 604 may be configured to store the single-use identifier against the payment account credentials using the payment network database 116.

The transaction module 606 is configured to work with the communication module 602 to receive a payment transaction request comprising at least the token and the payment amount associated with the cashless payment transaction from the merchant server 107 associated with the POS terminal 106, and to transmit the payment transaction response comprising an approval or a refusal for the cashless payment transaction to the merchant server 107. In some embodiments, the payment transaction request comprises a location of the POS terminal 106. The payment transaction request may comprise a location of the customer electronic device 102.

The authorisation module 608 is configured to transmit a request for authorisation to proceed with the cashless payment transaction to the issuer server 112, and to receive an authorisation response comprising an indication of whether the cashless payment transaction is approved or refused from the issuer server 112. The request for authorisation comprises at least the payment account credentials and the payment amount.

The authentication module 610 is configured to work with the communication module 602 to transmit a request for authentication to the customer electronic device 102, and to receive a response for authentication from the customer electronic device 102. The request for authentication is a request for the customer to approve the cashless payment transaction, while the response for authentication comprises an approval or a refusal for the cashless payment transaction to proceed. In some embodiments where the a location of the customer electronic device 102 is received by the payment network server 110 and the payment transaction request comprises a location of the POS terminal 106, the authentication module 610 is configured to determine if the location of the POS terminal 106 is within a pre-determined range of the location of the customer electronic device 102. The cashless payment transaction is refused if the location of the POS terminal 106 is outside the pre-determined range of the location of the customer electronic device 102.

FIG. 7 is a block diagram showing a technical architecture 700 of the payment network server 110. The issuer server 112 and/or the acquirer server 108 may also have this technical architecture. The merchant server 107 may share a similar technical architecture.

The technical architecture includes a processor 702 (which may be referred to as a central processor unit or CPU) that is in communication with memory devices including secondary storage 704 (such as disk drives), read only memory (ROM) 706, and random access memory (RAM) 708. The processor 702 may be implemented as one or more CPU chips. The technical architecture may further comprise input/output (I/O) devices 710, and system connectivity or network devices 712.

The secondary storage 704 typically comprises one or more disk drives or tape drives and is used for non-volatile storage of data and as an over-flow data storage device if RAM 708 is not large enough to hold all working data. Secondary storage 704 may be used to store programs which are loaded into RAM 708 when such programs are selected for execution.

In some embodiments, the secondary storage 704 has a processing component 704*a* comprising non-transitory instructions operative by the processor 702 to perform various operations of the method of the present disclosure. The ROM 706 is used to store instructions and perhaps data which are read during program execution. The secondary storage 704, the ROM 706, and/or the RAM 708 may be referred to in some contexts as computer readable storage media and/or non-transitory computer readable media.

I/O devices 710 may include printers, video monitors, liquid crystal displays (LCDs), plasma displays, touch screen displays, keyboards, keypads, switches, dials, mice, track balls, voice recognizers, card readers, paper tape readers, or other input devices.

The system connectivity or network devices 712 may take the form of modems, modem banks, Ethernet cards, universal serial bus (USB) interface cards, serial interfaces, token ring cards, fiber distributed data interface (FDDI) cards, wireless local area system (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other system devices. These system connectivity or network devices 712 may enable the processor 702 to communicate with the Internet or one or more intranets. With such a system connection, it is contemplated that the processor 702 might receive information from the system, or might output information to the system in the course of performing the above-described method operations. Such information, which is often represented as a sequence of instructions to be executed using processor 702, may be received from and outputted to the system, for example, in the form of a computer data signal embodied in a carrier wave.

The processor 702 executes instructions, codes, computer programs, scripts which it accesses from hard disk, floppy disk, optical disk (these various disk based systems may all be considered secondary storage 704), flash drive, ROM 706, RAM 708, or the system connectivity or network devices 712. While only one processor 702 is shown, multiple processors may be present. Thus, while instructions may be discussed as executed by a processor, the instructions may be executed simultaneously, serially, or otherwise executed by one or multiple processors.

Although the technical architecture is described with reference to a computer, it should be appreciated that the technical architecture may be formed by two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the technical architecture to provide the functionality of a number of servers that is not directly bound to the number of computers in the technical architecture. In an embodiment, the functionality disclosed above may be provided by executing an application and/or applications in a cloud computing environment. Cloud computing may comprise providing computing services via a system connection using dynamically scalable computing resources. A cloud computing environment may be established by an enterprise and/or may be hired on an as-needed basis from a third party provider.

It is understood that by programming and/or loading executable instructions onto the technical architecture, at least one of the CPU 702, the ROM 706, and the RAM 708 are changed, transforming the technical architecture in part into a specific purpose machine or apparatus having the novel functionality taught by the present disclosure. It is fundamental to the electrical engineering and software engineering arts that functionality that can be implemented by loading executable software into a computer can be converted to a hardware implementation by well-known design rules.

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

The invention claimed is:

1. A payment network server for improving data security in processing a cashless payment transaction via a point-of-sale (POS) terminal associated with a merchant server, the server comprising at least a computer processor and a data storage device, the data storage device comprising instructions operative by the processor to:

receive, from a customer electronic device, a tokenization request comprising payment account credentials for use in the cashless payment transaction, the payment account credentials being associated with a customer account maintained at an issuer institution;

generate a token associated with the tokenization request, the token being associated with the payment account credentials;

transmit, to the customer electronic device, a tokenization response comprising the token, wherein the token is transmitted from the customer electronic device to a payment card for processing the cashless payment transaction at the POS terminal;

receive, from the merchant server, a payment transaction request comprising the token, a payment amount, and a geolocation of the POS terminal, the payment amount being a monetary amount associated with the cashless payment transaction;

perform de-tokenization on the token to identify the payment account credentials associated with the token;

transmit, to an issuer server associated with the issuer institution, a request for authorisation to proceed with the cashless payment transaction, the request for authorisation comprising at least the payment account credentials and the payment amount;

receive, from the issuer server, an authorisation response comprising an indication of whether the cashless payment transaction is approved or refused;

receive a geolocation from the customer electronic device, the customer electronic device being configured to determine the geolocation using a global positioning system (GPS), and determine if the geolocation of the POS terminal is within a pre-determined range of the geolocation of the customer electronic device;

upon determining that the geolocation of the POS terminal is within a pre-determined range of the geolocation of the customer electronic device, transmit to the merchant server, a payment transaction response comprising an approval or a refusal for the cashless payment transaction based on the indication received from the issuer server.

2. The server of claim 1, wherein the processor is further configured to:
create a single-use identifier, the single-use identifier is associated with the payment account credentials and replaces the payment account credentials in the token;
store, using a payment network database, the single-use identifier against the payment account credentials; and
identify, using the payment network database, the payment account credentials based on the single-use identifier identified when the token is de-tokenized.

3. The server of claim 1, wherein the processor is further configured to:
transmit, to the customer electronic device, a request for authentication, the request for authentication being a request for a customer to approve the cashless payment transaction; and
receive, from the customer electronic device, a response for authentication comprising an approval or a refusal for the cashless payment transaction to proceed.

4. The server of claim 1, wherein the token is further associated with a pre-determined time limit within which the payment transaction request is to be received, and wherein, the processor is further configured to transmit, to the merchant server, a response to refuse the cashless payment transaction if the payment transaction request is received outside the pre-determined time limit.

5. The server of claim 1, wherein the processor is further configured to:
upon determining that the geolocation of the POS terminal is outside the pre-determined range of the geolocation of the customer electronic device, transmit to the merchant server, a payment transaction response comprising a refusal.

6. The server of claim 1, wherein the payment card is associated with a customer.

7. The server of claim 1, wherein the payment card is associated with a merchant.

8. The server of claim 1, wherein the token is transmitted to the payment card via near-field communication (NFC).

9. A computer-implemented method for improving data security in processing a cashless payment transaction via a point-of-sale (POS) terminal associated with a merchant server, the method comprising:
receiving, from a customer electronic device, a tokenization request comprising payment account credentials for use in the cashless payment transaction, the payment account credentials being associated with a customer account maintained at an issuer institution;
based on receiving the tokenization request, generating a single-use identifier, the single use-identifier being associated with the payment account credentials;
storing a mapping of the single-use identifier against the payment account credentials in a database;
transmitting, to the customer electronic device, a tokenization response comprising the single-use identifier, wherein the single-use identifier is transmitted from a customer electronic device to a payment card for processing the cashless payment transaction at the POS terminal;
receiving, from the merchant server, a payment transaction request comprising the single-use identifier and a payment amount, the payment amount being a monetary amount associated with the cashless payment transaction;
retrieving the single-use identifier from the mapping stored in the database;
using the retrieved single-use identifier once, identifying the payment account credentials;
transmitting, to an issuer server associated with the issuer institution, a request for authorisation to proceed with the cashless payment transaction, the request for authorisation comprising at least the payment account credentials and the payment amount;
receiving, from the issuer server, an authorisation response comprising an indication of whether the cashless payment transaction is approved or refused; and
transmitting, to the merchant server, a payment transaction response comprising an approval or a refusal for the cashless payment transaction.

10. The method of claim 9, wherein the payment account credentials are obfuscated by using the single-use identifier in form of a random string of characters in place of the payment account credentials.

11. The method of claim 9, further comprising: transmitting, to the customer electronic device, a request for authentication, the request for authentication being a request for a customer to approve the cashless payment transaction; and receiving, from the customer electronic device, a response for authentication comprising an approval or a refusal for the cashless payment transaction to proceed.

12. The method of claim 9, wherein if the payment transaction request is not received within a pre-determined time limit, a response to refuse the cashless payment transaction is transmitted to the merchant server.

13. The method of claim 9, wherein the method comprises receiving, from the customer electronic device, a geolocation of the customer electronic device determined using a global positioning system; wherein the payment transaction request further comprises a geolocation of the POS terminal determined using the global positioning system, and wherein the method further comprises:
  determining if the geolocation of the POS terminal is within a pre-determined range of the geolocation of the customer electronic device, wherein the cashless payment transaction is refused if the geolocation of the POS terminal is outside the pre-determined range of the geolocation of the customer electronic device.

14. The method of claim 9, wherein the payment card is associated with a customer.

15. The method of claim 9, wherein the payment card is associated with a merchant.

16. The method of claim 9, wherein the single-use identifier is transmitted to the payment card via near-field communication (NFC).

17. A non-transitory computer-readable medium for improving data security in processing a cashless payment transaction via a point-of-sale (POS) terminal associated with a merchant server having stored thereon program instructions for causing at least one processor to perform:
  receiving, from a customer electronic device, a tokenization request comprising payment account credentials for use in the cashless payment transaction, the payment account credentials being associated with a customer account maintained at an issuer institution;
  based on receiving the tokenization request, generating a a single-use identifier, the single-use identifier being associated with the payment account credentials;
  storing a mapping of the single-use identifier against the payment account credentials in a database;
  transmitting, to the customer electronic device, a tokenization response comprising the single-use identifier, wherein the single-use identifier is transmitted from a customer electronic device to a payment card for processing the cashless payment transaction at the POS terminal;
  receiving, from the merchant server, a payment transaction request comprising the single-use identifier and a payment amount, the payment amount being a monetary amount associated with the cashless payment transaction;
  retrieving the single-use identifier from the mapping stored in the database;
  using the retrieved single-use identifier once, identifying the payment account credentials;
  transmitting, to an issuer server associated with the issuer institution, a request for authorisation to proceed with the cashless payment transaction, the request for authorisation comprising at least the payment account credentials and the payment amount;
  receiving, from the issuer server, an authorisation response comprising an indication of whether the cashless payment transaction is approved or refused; and
  transmitting, to the merchant server, a payment transaction response comprising an approval or a refusal for the cashless payment transaction.

18. The non-transitory computer-readable medium of claim 17, wherein the payment account credentials are obfuscated by using the single-use identifier in form of a random string of characters in place of the payment account credentials.

19. The non-transitory computer-readable medium of claim 17 having stored thereon program instructions for further causing the at least one processor to perform: transmitting, to the customer electronic device, a request for authentication, the request for authentication being a request for a customer to approve the cashless payment transaction; and
  receiving, from the customer electronic device, a response for authentication comprising an approval or a refusal for the cashless payment transaction to proceed.

20. The non-transitory computer-readable medium of claim 17, wherein if the payment transaction request is not received within a pre-determined time limit, a response to refuse the cashless payment transaction is transmitted to the merchant server.

* * * * *